US 6,528,451 B2

(12) United States Patent
Brezny et al.

(10) Patent No.: US 6,528,451 B2
(45) Date of Patent: Mar. 4, 2003

(54) CATALYST SUPPORT MATERIAL HAVING HIGH OXYGEN STORAGE CAPACITY AND METHOD OF PREPARATION THEREOF

(75) Inventors: Rasto Brezny, Silver Spring, MD (US); Manoj M Koranne, Clarksville, MD (US); Takeshi Egami, Wayne, PA (US); Eugene Mamontov, Philadelphia, PA (US)

(73) Assignee: W.R. Grace & Co.-Conn., Columbia, MD (US)

( * ) Notice: Subject to any disclaimer, the term of this patent is extended or adjusted under 35 U.S.C. 154(b) by 142 days.

(21) Appl. No.: 09/804,873

(22) Filed: Mar. 13, 2001

(65) Prior Publication Data

US 2002/0132732 A1 Sep. 19, 2002

(51) Int. Cl.[7] .......................... B01J 23/00; B01J 23/02; B01J 23/06; B01J 21/04; C04B 35/48
(52) U.S. Cl. ................. 502/304; 502/340; 502/349; 502/439; 501/104; 423/263; 423/608
(58) Field of Search ................. 502/302, 303, 502/304, 340, 349, 439; 423/263, 608; 501/104, 152

(56) References Cited

U.S. PATENT DOCUMENTS

| | | | |
|---|---|---|---|
| 4,714,694 A | * 12/1987 | Wan et al. | 502/304 |
| 4,965,245 A | 10/1990 | Sugimoto et al. | 505/1 |
| 5,015,617 A | 5/1991 | Ohata et al. | 502/304 |
| 5,039,647 A | 8/1991 | Ihara et al. | 502/251 |
| 5,045,521 A | 9/1991 | Lox et al. | 502/304 |
| 5,063,193 A | 11/1991 | Bedford et al. | 502/304 |
| 5,128,306 A | 7/1992 | Dettling et al. | 502/304 |
| 5,139,992 A | 8/1992 | Tauster et al. | 502/304 |
| 5,491,120 A | 2/1996 | Voss et al. | 502/304 |
| 5,607,892 A | 3/1997 | Chopin et al. | 502/304 |
| 5,693,299 A | 12/1997 | Chopin et al. | 423/213.2 |
| 5,747,401 A | * 5/1998 | Cuif | 501/103 |
| 5,919,727 A | * 7/1999 | Brezny | 502/304 |
| 6,037,305 A | * 3/2000 | Cuif et al. | 502/304 |
| 6,051,529 A | * 4/2000 | Brezny | 502/302 |
| 6,139,814 A | * 10/2000 | Shigapov et al. | 423/592 |
| 6,150,288 A | * 11/2000 | Suzuki et al. | 501/105 |
| 6,228,799 B1 | * 5/2001 | Aubert et al. | 502/304 |
| 6,306,794 B1 | * 10/2001 | Suzuki et al. | 502/304 |
| 6,335,305 B1 | * 1/2002 | Suzuki et al. | 502/325 |
| 6,350,421 B1 | * 2/2002 | Strehlau et al. | 423/213.2 |
| 6,355,220 B1 | * 3/2002 | Blanchard et al. | 423/242.1 |
| 6,387,338 B1 | * 5/2002 | Anatoly et al. | 423/239.1 |

* cited by examiner

Primary Examiner—Stanley S. Silverman
Assistant Examiner—Cam N. Nguyen
(74) Attorney, Agent, or Firm—Beverly J. Artale

(57) ABSTRACT

Mixed oxides of cerium oxide and zirconium oxides having a high oxygen storage and high oxygen release rate are disclosed. The mixed oxides are made of polycrystalline particles of cerium oxide and zirconium oxide having a controlled domain structure on the subcrystalline level wherein adjacent domains within a single crystallite have a different ratio of zirconium and cerium. The mixed oxides are prepared by a co-precipitation technique using mixed salt solutions of cerium and zirconium having a solid content of at least 23%, based on an oxide basis.

67 Claims, 2 Drawing Sheets

CATALYST SUPPORT MATERIAL HAVING HIGH OXYGEN STORAGE CAPACITY AND METHOD OF PREPARATION THEREOF

FIELD OF THE INVENTION

The present invention relates to novel compositions based on mixed oxides of cerium oxide and zirconium oxide having a high oxygen storage capacity. This invention also relates to a novel process for the preparation of the mixed oxide compositions, and the method of using the mixed oxide compositions as catalysts and/or catalyst supports, in particular, for the purification and/or conversion of exhaust gases from internal combustion engines.

BACKGROUND OF THE INVENTION

Cerium oxide has been widely employed as a promoter of a catalyst for purifying exhaust gases emitted from an internal combustion engine because of its good oxygen storage ability. Typically, to improve the oxygen storage capacity (OSC), cerium oxide is usually employed as small particles having a relatively high specific surface area. Unfortunately, however, cerium oxide tends to sinter and lose surface area under high temperature conditions thereby losing their effectiveness as an oxygen storage component.

More recently, the need to thermally stabilize cerium oxide based catalysts against deactivation at higher temperatures has focused attention on doping cerium oxide with a wide range of metals oxides. To this end, numerous prior art references have proposed incorporating zirconium oxide or other oxides of rare-earth elements into cerium oxide to slow down the sintering process and provide high surface area materials. For example, Japanese Patent Application 55,15/1992, discloses a process for preparing mixed cerium oxide and zirconium oxide wherein a solution containing trivalent cerium salt and zirconium salt is co-precipitated with a base in the presence of hydrogen peroxide. The process provides mixed oxides of cerium and zirconium having a high specific surface area and an excellent heat resistance.

It has also been proposed that pure solid solutions of cerium oxide and zirconium oxide having a high surface area are required to be effective oxygen storage components in automotive catalytic converters. Various cerium oxide/zirconium oxide compositions having high surface area have been reported.

For example, U.S. Pat. No. 5,693,299 discloses cerium oxide/zirconium oxide mixed oxide having thermal stability, very high specific surface area of at least 80 m$^2$/g. The mixed oxides are obtained by thermohydrolysis and possess a pure monophasic $CeO_2$ cubic crystalline habit wherein zirconium is incorporated into the crystalline habit of the cerium oxide.

U.S. Pat. No. 5,607,892 also discloses cerium/zirconium mixed oxide particles having high stable specific surface area. The mixed oxides are obtained by intimately admixing a zirconium sol with a cerium sol, precipitating the mixture with a base to recover a precipitate, and thereafter calcining the recovered precipitate. An oxygen storage capacity, measured on a product calcined at 1,000° C., of only 2.8 ml CO/g $CeO_2$ (62.5 micromole $O_2$ per gram of $CeO_2$) was reported.

In order to meet stringent future emission standards, it is necessary that cerium oxide based catalysts exhibit high OSC even after exposure to temperature in excess of 1,000° C. Since cerium based catalysts exposed to such high temperatures typically lose surface area, there is a need to develop cerium based materials which have a high OSC independent of surface area.

Further due to recent advances in engine control technology, newer engines possess a even tighter air-fuel ratio control resulting in rapid changes in oxygen partial pressure at the location of the catalyst. Catalyst useful in such engines are not only required to possess a higher oxygen storage capacity than prior known catalysts, but also a high rate of oxygen release in order to respond to such fluctuations in oxygen partial pressure. Consequently, there exists a need in the automotive industry for catalyst/catalyst support materials which possess both a high oxygen storage capacity and an increased rate of oxygen release under high temperature conditions.

SUMMARY OF THE INVENTION

Novel compositions based on mixed oxides of cerium and zirconium having an exceptionally high oxygen storage and release capacity have been developed. Mixed cerium oxide/zirconium oxide in accordance with the invention possess a nominally cubic, polyphasic crystalline habit based on a uniquely controlled domain crystalline substructure. Unexpectedly, mixed oxide compositions in accordance with the present invention possess a high oxygen storage capacity independent of surface area.

Mixed oxide compositions in accordance with the invention comprise polycrystalline particles based on cerium oxide and zirconium oxide. Crystallites comprising the polycrystalline particles are composed of regions or "domains" at the subcrystalline level having varying atomic ratios of cerium and zirconium. In accordance with the present invention, it has been found that when adjacent domains within a single crystallite sufficiently vary in their atomic ratios of cerium and zirconium, a unique crystalline sub-structure will be present which promotes increased oxygen storage and oxygen release.

Without wishing to be bound to any particular theory, it is theorized that the compositional variation between adjacent domains causes adjacent domains to possess different lattice parameters. This difference in lattice parameters is believed to result in localized strain at the domain boundaries. It is hypothesized that such localized strain along the boundaries of adjacent domains provide a network of internal pathways throughout the crystallites. It is believed that the presence of these pathways permits oxygen to be rapidly absorbed into and released from the bulk crystalline lattice, thereby providing increased oxygen storage and release capability independent of the external surface area of the particles.

Accordingly, a major advantage of the present invention is to provide novel cerium oxide/zirconium oxide compositions having a specified domain crystalline substructure which promotes an increased oxygen storage capacity and rate of oxygen release when compared to prior cerium oxide/zirconium oxide compositions.

Another advantage of the present invention is to provide novel cerium oxide/zirconium oxide compositions which exhibits a high oxygen storage capacity independent of surface area.

It is also an advantage of the present invention to provide cerium oxide/zirconium oxide compositions having a high oxygen storage capacity which compositions do not require a pure mono-phasic cubic solid solution of either cerium oxide dissolved in zirconium oxide or zirconium oxide dissolved in cerium oxide as heretofore taught by the prior art.

It is yet another advantage of the present invention to provide novel mixed oxides of cerium and zirconium which are highly effective as catalyst/catalyst support for the purification of exhaust gases.

Still another advantage of the present invention is to provide a process for the preparation and use of the novel cerium oxide/zirconium oxide compositions. Other advantages and objects of the present invention will be understood from the detail of the description, examples and claims.

DETAILED DESCRIPTION OF THE INVENTION

Figure 1:
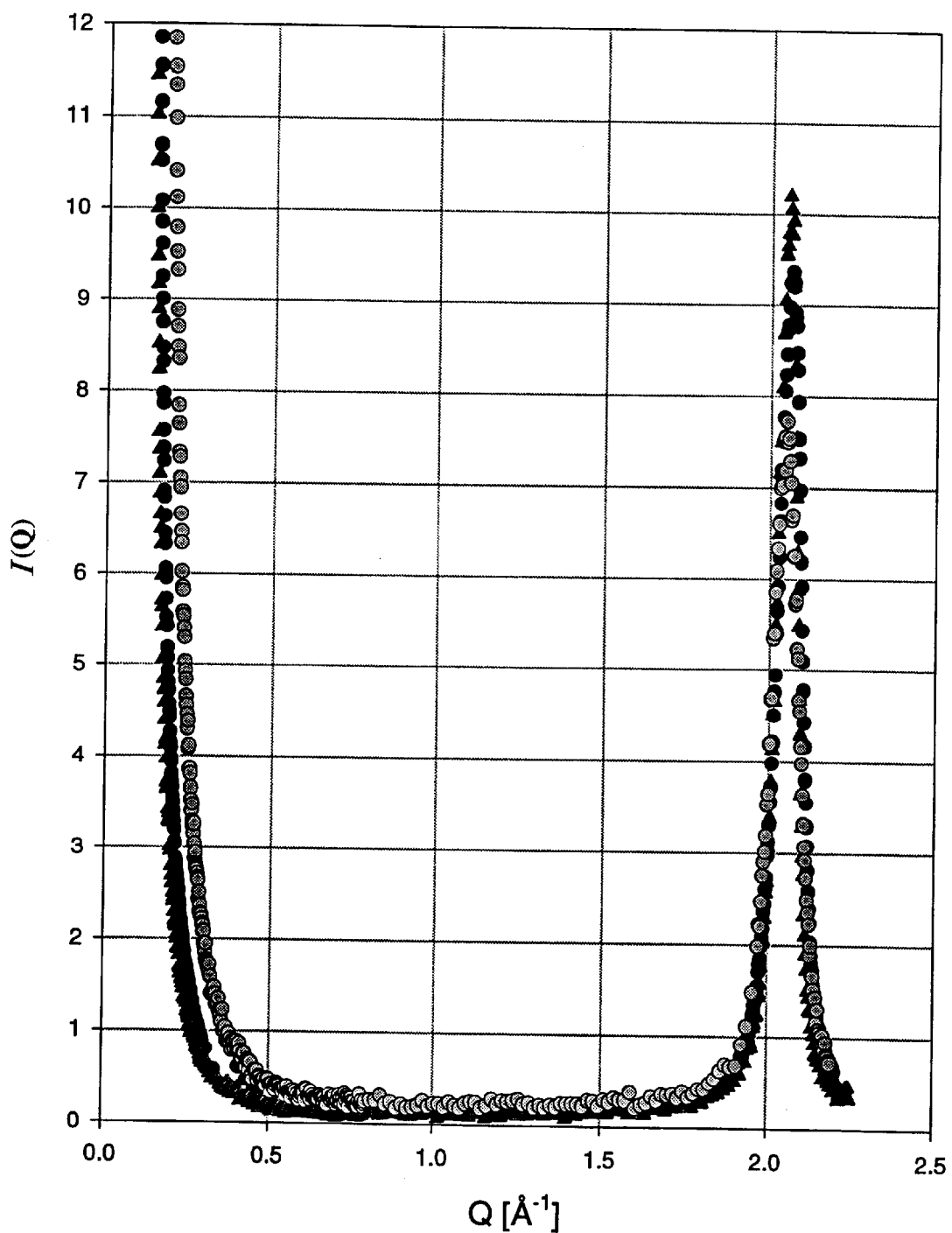
FIG. 1 is a plot of the Normalized Scattering Intensity I(Q) between 0 and 12 versus Q ranging from 0.0 to 2.5 $Å^{-1}$, as determined by a small angle X-ray scattering (SAXS) technique, for cerium oxide/zirconium oxide compositions prepared in accordance with Example 1 (●), Comparative Example 1 (▲) and Comparative Example 3 (●) which plot shows the position of the first diffraction peak at Q equals 2.06 $Å^{-1}$ from which the scattering intensity is normalized.

The present invention will now be explained in detail herein below.

The term "oxygen storage capacity" (OSC) is used herein to indicate the amount of oxygen stored in a sample as determined by measuring weight loss using conventional Thermal Gravimetric Analysis (TGA). The sample is held at 500° C. in flowing air at a rate of 120 cc per minute for 60 minutes to fully oxidize it. The air stream is then immediately replaced with a mixture of 10% $H_2$ in nitrogen at the same temperature and flow rate and held isothermally for an additional 60 minutes. Oxygen storage capacity is determined by measuring the weight loss going from oxidizing to reducing conditions. The unit used to characterize the OSC is micromole $O_2$ per gram of sample.

The term "oxygen release rate" is used herein to indicate the velocity at which the oxygen leaves the Ce/Zr particles as measured by TGA. The sample is held at 500° C. in flowing air at a rate of 120 cc per minute for 60 minutes to fully oxidize it. The air stream is then immediately replaced with a mixture of 10% $H_2$ in nitrogen at the same temperature and flow rate and held isothermally for an additional 60 minutes. Oxygen release rate is calculated from the first derivative of the weight loss versus time curve and then is normalized by surface area of the particles. The unit used to characterize the oxygen release rate is mg-$O_2$/$m^2$-min.

The term "polycrystalline particle" is used herein to indicate a particle made up of more than two crystallites as measured by conventional X-ray diffraction.

The term "crystallite" is used herein to indicate regions within a particle having the same crystallographic orientation and structure as determined by line broadening using conventional X-ray diffraction.

The term "domain" is used herein to indicate a region or volume within a single crystallite having a homogenous or a substantially homogenous composition as determined by small angle X-ray scattering (SAXS). In accordance with the present invention, the Ce:Zr ratio of a domain is controlled to be different from adjacent domains comprising the crystallite.

The term "subcrystalline structure" is used herein to indicate a region within a single crystallite which consists of two or more domains.

The term "polyphasic" is used herein to indicate a material containing more than one crystalline phase. This phase may consist of more than one crystalline structure, e.g. cubic and tetragonal, or the same structure but a different lattice parameter.

The term "inhomogeneity" is used herein to indicate adjacent domains within a single crystallite having a different Ce:Zr atomic ratio.

The term "surface area" is used herein to indicate the surface area of a particle as measured by standard BET analysis.

The term "aging" is used herein to indicate heating a sample for the purpose of accelerating changes in the properties of the sample.

The term "Normalized Scattering Intensity I(Q)" is used herein to indicate the scattering intensity as determined by a small angle X-ray scattering (SAXS) measurement divided by a constant such that the integrated intensity under the first diffraction peak centered at approximately Q=2.06 $Å^{-1}$ is equal to one.

Mixed oxide compositions in accordance with the present invention have a polyphasic crystalline structure and are made of polycrystalline particles. Each particle has a cerium oxide component and a zirconium oxide component and is comprised of a plurality of crystallites. Each crystallite in a particle is comprised of a subcrystalline structure which comprises a plurality of domains wherein the Ce:Zr atomic ratio of adjacent domains is different and is characterized by a specified degree of inhomogeneity in relation to each other, when measured by small angle X-ray scattering (SAXS). It will be understood that the SAXS measurement is performed on a multi-particle sample and the data collected represents an average distribution of the level of inhomogeneity between domains at the subcrystalline level of the particles in the sample. It is therefore inferred from the SAXS data that the individual particles will on the average possess the above-described structure.

In accordance with the invention, domains have an average size of about 10 to about 50 Å, preferably about 10 to about 30 Å in freshly prepared material. After aging at 1000° C. for 5 hours the domains will have an average size of about 10 to 50 Å.

The domains are distributed within crystallites of cerium oxide and zirconium oxide having an average crystallite size of about 40 to about 200 Å, preferably about 50 to 120, Å, as readily determined using X-ray diffraction, using the peak at 28–30° 2θ after calcination at 900° C. for 4 hours. The crystallites in turn make up the polycrystalline particles having an average particle size ranging from about 0.1 to about 50 μm, preferably about 0.5 to 20 μm.

In general, mixed oxide particles of the present invention comprises about 80 to 20 weight % $CeO_2$ and about 20 to 80 weight % $ZrO_2$ preferably about 40 to 60% weight $CeO_2$ and about 60 to 40 weight % of $ZrO_2$. In a preferred embodiment, the mixed oxide composition includes 50 weight % $CeO_2$ and 50 weight % of $ZrO_2$. Optionally, mixed oxide particles of the invention may comprise up to about 10 weight %, preferably up to about 8 weight %, most preferably from about 2 to about 7 weight %, of an additional metal oxide other than cerium. Suitable additional metal oxides, include but are not limited to, oxides of rare earths metals other than cerium, calcium oxide and mixtures thereof. Suitable rare earth metal oxides include, but are not limited to, oxides of lanthanum, praseodymium, neodymium, samarium, gadolinium and yttrium.

Typically, the mixed oxide compositions of the invention have a specific surface area after calcination at 500° C. for 2 hours of at least 30 m$^2$/g, more preferably of at least 40 m$^2$/g, and even more preferably of at least 50 m$^2$/g, and typically will range from about 30 to about 120, preferably from about 40 to about 100, most preferably from about 50 to 90, m$^2$/g. After aging at 1000° C. at 4 hours, the specific surface area is no more than 10 m$^2$/g, preferably no more than 5 m$^2$/g, most preferably no more than 3 m$^2$/g, and typically ranges from about 10 to about 1, preferably from about 5 to about 1, most preferably from about 3 to about 1, m$^2$/g.

Advantageously, mixed oxides of the present invention exhibit simultaneously a high oxygen release rate and a high oxygen storage capacity. Mixed oxides of the present invention have an oxygen storage capacity measured isothermally at 500° C. of typically at least 260 $\mu$mol O$_2$/g sample, preferably, greater than 300 $\mu$mol O$_2$/g sample, even more preferably, greater than 315 $\mu$mol O$_2$/g sample and most preferably, greater than 330 $\mu$mol O$_2$/g sample, after aging at 1000° C. for 4 hours. Typically, the mixed oxides of the invention will possess an OSC ranging from about 260 to about 800, preferably about 300 to about 600, most preferably about 350 to about 450, $\mu$mol O$_2$/g sample, after aging at 1000° C. for 4 hours.

The mixed oxides of the present invention have a high oxygen release rate of typically greater than 1.0 mg-O$_2$/m$^2$-min, preferably greater than 2.0 mg-O$_2$/m$^2$-min, most preferably greater than 5.0 mg-O$_2$/m$^2$-min, after aging at 1000° C. for 4 hours. Typically, the mixed oxides will possess an oxygen release rate ranging from about 1 to about 100, preferably from about 2 to about 50, most preferably from about 5 to about 10, mg-O$_2$/m$^2$-min, after aging at 1000° C. for 4 hours.

The properties of increased oxygen storage and release exhibited by the cerium oxide/zirconium oxide compositions of the invention is achieved by controlling the compositional variation in Ce:Zr atomic ratios of adjacent domains within a single crystallite such that different lattice parameters are created between adjacent domains. As will be understood by those skilled in the art, some domains will be cerium oxide rich, i.e., consist predominately of cerium oxide with zirconium oxide dissolved in cerium oxide, whereas other domains will be zirconium oxide rich, i.e., consist predominately of zirconium oxide having cerium oxide dissolved in the zirconium oxide. However, if the compositions of adjacent domains is too homogenous or too inhomogenous, the required domain structure will not be present in the mixed compositions to provide the desired oxygen storage and release ability. Thus, the degree of compositional variation or inhomogeneity between adjacent domains is important to achieve compositions having increased oxygen storage capacity simultaneously with increased oxygen release rates independent of surface area.

The degree of compositional variation between adjacent domains may be determined by using SAXS as described herein below.

While the goal of conventional X-ray scattering is to determine the crystal structure and the positions of atoms, the purpose of the SAXS measurement is to probe local structural features at a scale larger than the atomic distance, usually in tens and hundreds of angstroms. The scattering angle 2θ between the incident beam and the detector is related to the scattering vector Q as Q=(4π/λ)sin θ, where λ is the X-ray wavelength. The magnitude of the scattering vector Q defines the characteristic length which is probed by X-rays as π/Q. By measuring X-ray diffraction intensity at lower angles, thus at smaller scattering vectors Q, one can probe spatially extended structural features in materials. To avoid the interference between the incident beam and the X-ray scattering intensity which is being measured at a very low angle, SAXS requires very stringent collimation conditions on the incident beam. Thus the SAXS measurement cannot be done with a standard X-ray diffractometer. For the measurement described in this patent, however, it is necessary at the same time to measure the scattering intensity at relatively higher angles, in order to normalize the intensity as will be explained in detail below. Synchrotron X-ray radiation provides an ideal means to achieve this goal, since its low-divergence, high-intensity incident beam facilitates the collimation, allowing measuring the X-ray scattering intensity through a wide range of angles, and minimizes measurement time. The SAXS scattering measurements described herein were performed at the beamline X-7A of the National Synchrotron Light Source at the Brookhaven National Laboratory, Upton, N.Y. The incident X-rays with the wavelength of λ=0.912 Å illuminated sample materials packed between the thin layers of capton, a polymer material highly transparent to X-rays. Typical thickness of the samples was in the range of 10 to 100 $\mu$m. The scattering intensity was measured with a standard detector for the angles 0.66°<2θ<2.5.15° which correspond to Q in the range of about 0.08 Å$^{-1}$ to about 3.0 $^{-1}$. The incident X-ray beam was collimated in such a way that the contribution of the incident beam to the scattered intensity measured even at the lowest angle of 2θ=0.66° was negligible. The X-ray scattered intensity was collected for several seconds at each measurement point.

The intensity of the SAXS from the systems with phase separation obeys Porod's law, $$I(Q)=K/Q^4 \qquad (1)$$

where I(Q) is the Normalized Scattering Intensity. In FIG. 1 the plot of the Normalized Scattering Intensity I(Q) versus Q shows a first diffraction peak centered at approximately Q=2.06 Å$^{-1}$ from which the scattering intensity was normalized.

In Equation (1) K is given by Equation (2):

$$K=2\pi(\Delta\rho)^2 S \qquad (2)$$

where $\Delta\rho$ is the difference in the electron density between the two phases, S is the interfacial area between the phases and is measured in units of Å$^2$. At a given value of S the magnitude of I increases with increasing $\Delta\rho$, which in the case of (Ce, Zr)O$_2$ mixed oxides is primarily due to compositional variation between domains within a crystal. If one considers a two-phase sample with compositions (Ce$_{1-X1}$Zr$_{X1}$)O$_2$ in one phase and (Ce$_{1-X2}$Zr$_{X2}$)O$_2$ in the other, then $\Delta\rho$ is equal to 0.49(X1–X2). The magnitude of the intensity at a specific Q is a measure of the compositional inhomogeneity.

The logarithmic plot of Equation (1) is a straight line described by Equation (3):

$$\ln(I(Q))=\ln(K)-4\ln(Q) \qquad (3)$$

Therefore, for the scattering intensities collected from different samples and normalized in the same way the slope of the resulting straight lines is –4, whereas the intercept depends on the parameters $\Delta\rho$ and S.

To determine the degree of inhomogeneity within the subcrystalline domain structure of mixed oxides in accordance with the present invention, a SAXS measurement is carried out for scattering vectors Q ranging from about 0.08 $\text{Å}^{-1}$ to about 3.0 $\text{Å}^{-1}$. The Normalized Scattering Intensity I(Q) is then plotted as a function of the scattering vector Q, as defined above, in the unit of $\text{Å}^{-1}$, rather than as a function of $2\theta$, as is usually practiced.

Mixed oxides in accordance with present invention possess the critical degree of inhomogeneity when they exhibit a Normalized Scattering Intensity I(Q) ranging from about 49 and about 119, preferably from about 50 to about 100, most preferably from about 54 to about 85, when scattering Q is 0.10 $\text{Å}^{-1}$. Typically, the slope of the straight line portion of the logarithm plot of the Normalized Scattering Intensity, ln(I(Q)), as a function of logarithm of the scattering vector, ln(Q), at $-2.5 < \ln(Q) < -1$, is about $-4.0$, and therefore complies with Porod's Law. It is well known by one skilled in the art that SAXS data which conforms to Porod's Law will be most predictive of the desired domain substructure.

In accordance with the present invention, the mixed oxides are typically prepared by a co-precipitation of a mixed salt solution containing a cerium salt and a zirconium salt dissolved in a suitable solvent, e.g. water or an organic solvent. In a preferred embodiment, the solvent is water.

The solids concentration of mixed salt solutions used to prepare the mixed oxide of the present invention is important. If the solids content is too low, a subcrystalline structure having the desired degree of inhomogeneity will not form. Thus, the solids content of the solution is controlled to ensure the desired inhomogeneity. Typically, the mixed salt solution will possess a solids concentration sufficient to facilitate formation of the desired domain structure. Preferably, the mixed salt solution will have a concentration of greater than about 23 weight % solids, even more preferably, greater than about 25 weight % solids, and most preferably greater than about 27 weight % solids, based on an oxide basis. Typically, the concentration of the mixed salt solution ranges from about 24 weight % to about 39 weight % solids, preferably, about 25 weight % to about 29 weight % solids, based on an oxide basis.

Mixed salt solutions useful to prepare mixed oxides in accordance with the present invention may be prepared by any conventional method. Typically, the mixed salt solution is prepared by mixing a cerium salt with a zirconium salt in a manner and under conditions sufficient to dissolve all or substantially all of the solids content in a suitable solvent. In one embodiment, the mixed salt solution is prepared by a mixing a cerium salt with an aqueous zirconium salt solution having a cation to anion molar ratio of typically 1:1 to 1:2. For example, when the zirconium salt is zirconium oxynitrate, the zirconium salt solution will have a cation to anion molar ratio of typically, 1:2. On the other hand, when the zirconium salt is zirconium hydroxy nitrate, the zirconium salt solution will have a cation to anion molar ratio of typically 1:1.

In another embodiment of the invention, the mixed salt solution is prepared by dissolving cerium carbonate into an aqueous zirconium salt solution to provide a solution having a 1:2 cation to anion molar ratio and thereafter adding to the solution a minimum amount of an acid sufficient to dissolve all or substantially all of the carbonate as evidenced by a clear or transparent solution.

Suitable cerium and zirconium salts which may be employed to prepare mixed salt solutions useful in the process of the present invention include, but are not limited to, nitrates, chlorides, sulfates, carbonates and the like. Additional oxide components, i.e. dopants, may be added to the mixed salt solution in any soluble form.

Precipitation of the mixed salt solution may be accomplished by treating the solution with a base, preferably ammonia, with agitation to precipitate the corresponding hydroxide. The pH during precipitation is basic, e.g. the pH typically ranges from about 8 to 11.

Following precipitation, the resulting precipitate is treated with an oxidizing agent in an amount sufficient to completely or substantially oxidize any $Ce^{+3}$ to $Ce^{+4}$. Suitable oxidizing agents include but are not limited to, an aqueous solution of bromine, hydrogen peroxide, sodium bromate, sodium hypochlorite, ozone, chlorine dioxide, and the like. The preferred oxidizing agent is hydrogen peroxide. Typically, the precipitate is treated with an aqueous solution of hydrogen peroxide in an amount sufficient to provide a molar ratio of hydrogen peroxide to Ce of typically from about 0.25 to about 1. Preferably, the aqueous hydrogen peroxide solution is a dilute hydrogen peroxide having less than about 35 wt % of hydrogen peroxide. Typically, dilute hydrogen peroxide is added in an amount sufficient to provide a molar ratio of hydrogen peroxide to Ce of from about 0.5 to about 1.

It is desirable that the temperature during both the precipitation and oxidization steps not exceed 80° C., preferably 70° C. and most preferably 60° C. In a preferred embodiment of the invention, the temperature during the precipitation or the oxidization step will typically range from about 20° C. to about 70° C., and preferably from about 30° C. to about 60° C. Following precipitation, the precipitate is optionally aged at a temperature of typically from about 70° C. to 100° C. for about thirty minutes to about 5 hours.

The resulting precipitate is filtered and then washed with water to provide a filter cake. The filter cake is dried using any conventional techniques to provide a free-flowing powder. In a preferred embodiment, the washed precipitate is re-slurried in water and the resulting slurry is subjected to spraying drying. The dried precipitate is thereafter calcined at a temperature of about 500° C. to about 600° C. for about 30 minutes to about 6 hours, preferably about 1 to about 4 hours, most preferably about 2 to about 3 hours, to form a mixed oxide in accordance with the invention.

Optionally, a dopant may be added to the mixed oxide. When added, the dopant may be added at any point during preparation of the mixed oxides. Preferably, the dopant is added following precipitation but before or after calcination of the mixed oxide. Suitable dopants include Group VIII transition metals in the form of oxides, salts and the like. Preferably, the dopants include nickel, palladium or platinum, with palladium and platinum being the most preferred. Typically, dopants are added in amounts sufficient to provide from about 15 ppm to about 1000 ppm, based on the weight of the mixed oxide, in the final mixed oxide product. It is desirable to add a dopant for the purposes of facilitating testing.

The calcined mixed oxide may thereafter be milled using an impact milling technique to achieve the desired particle size. Suitable milling techniques include, but are not limited to, high-energy ball milling, Spex milling, fluid energy milling and the like.

The increased oxygen storage capacity and oxygen release rate of the mixed oxide compositions of the present invention permit them to be used for numerous applications. In particular the mixed oxides of the invention are well suited for catalysis applications, as catalyst and/or catalyst supports. In a preferred embodiment mixed oxide compositions according to the invention are used as constituents of a catalyst for the treatment or conversion of exhaust gases emanating from internal combustion engines. For this application, the mixed oxide compositions of the invention are generally admixed with alumina before or after impregnation by catalytically active elements, such as noble metals. Such mixtures are then either shaped to form catalyst, for example in the form of beads, or used to form a coating of a refractory body such as a ceramic or metallic monolith, this coating per se being well known in this art as a "washcoat", as described for example in U.S. Pat. Nos. 5,491,120; 5,015,617; 5,039,647; 5,045,521; 5,063,193; 5,128,306; 5,139,992; and 4,965,245, said references being herein incorporated by reference.

To further illustrate the present invention and the advantages thereof, the following specific examples are given. The examples are given as specific illustrations of the claim invention. It should be understood, however, that the invention is not limited to the specific details set forth in the examples.

All parts and percentages in the examples as well as the remainder of the specification are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

The oxygen storage capacity (OSC) recited in the examples were determined by measuring weight loss using conventional Thermal Gravimetric Analysis. The Samples are held at 500° C. in flowing air for 60 minutes to fully oxidize it before switching to a mixture of 10% $H_2$ in nitrogen and held isothermally for an additional 60 minutes. Oxygen storage capacity is determined by weight loss going from oxidizing to reducing conditions.

All oxygen release rates cited in the examples were determined by calculating the first derivative of the weight change versus time profile of the OSC measurement and normalizing it by the surface area of the sample.

Example 1

586 g of cerium (III) carbonate (49.5% oxide) was dissolved in 1105 g of an aqueous (20%) zirconyl nitrate solution and 310 g of concentrated nitric acid. The final solution contained 26.7 wt % solids as oxides. The solution was allowed to stir overnight to completely dissolve the carbonate. 93 g of this solution was poured into 400 ml of 5N ammonia solution at a temperature of 40° C. under continuous agitation. The final pH after all of the nitrate solution was added was approximately 9. The slurry was mixed for 30 minutes at 40° C. after which time, 52 g of a 3 wt % aqueous hydrogen peroxide solution was added. The molar ratio of hydrogen peroxide to cerium oxide was 0.25.

The precipitate was washed with 5 volume equivalents of hot DI water. The ammonium nitrate was washed from the precipitate to a conductivity below 5 mS/cm.

Figure 2:
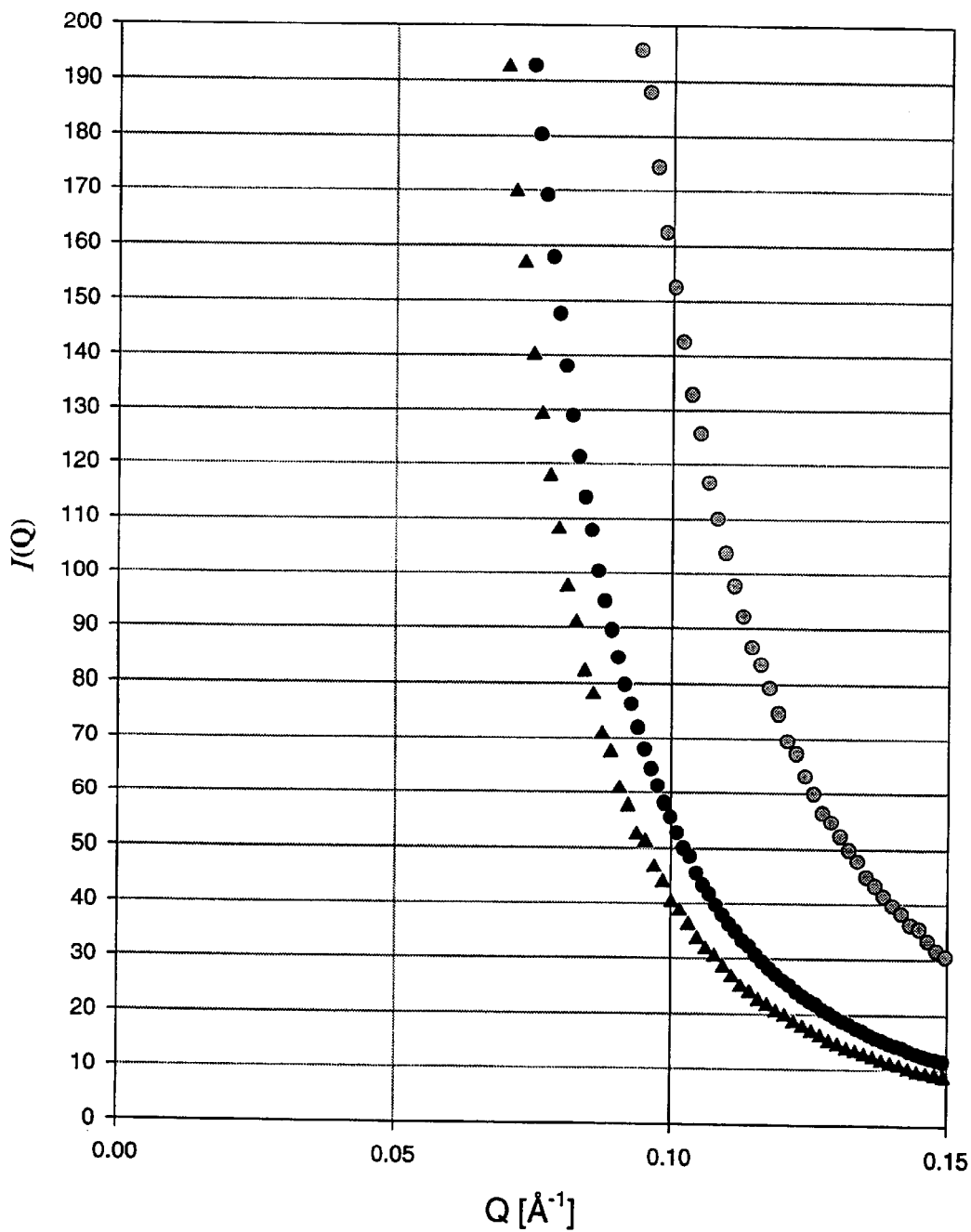
FIG. 2 is a plot of the Normalized Scattering Intensity I(Q) between 0 and 200 versus Q ranging from 0.0 to 0.15 $Å^{-1}$, as determined by a small angle X-ray scattering (SAXS) technique, for cerium oxide/zirconium oxide compositions prepared in accordance with Example 1 (●), Comparative Example 1 (▲) and Comparative Example 3 (●).

The filter cake was diluted with water in a ratio of 1:1 to form a slurry and the aqueous slurry was spray dried to obtain a powder. The dried powder was calcined at 500° C. for 1 hour to yield a final mixed oxide composition of 42 wt % zirconium oxide and 58 wt % cerium oxide. The powder was analyzed using small angle X-ray scattering (SAXS). The powder exhibited a Normalized Scattering Intensity I(Q) at Q=0.1 $Å^{-1}$ of 57 as shown in FIG. 2. The Normalized Scattering Intensity I(Q) versus Q was plotted in FIG. 1.

For the purpose of measuring the OSC, 15 ppm palladium was impregnated into the calcined mixed oxide powder as an aqueous nitrate solution and calcined at 500° C. The powder was aged at 1000° C. for 4 hours and the OSC was measured using the previously described TGA test. The aged surface area was 1.0 $m^2$/g, the oxygen storage capacity (OSC) was 363 μmole $O_2$/g sample and the oxygen release rate was 1.8 mg-$O_2$/$m^2$-min.

Example 2

A filter cake was prepared using the procedure as described in Example 1 except when the filter cake was diluted with water in a ratio of 1:1 to form a slurry, the 15 ppm palladium was added to the slurry as an aqueous nitrate solution prior to spray drying. The dried powder was calcined at 500° C. for 1 hour. The powder was aged at 1000° C. for 4 hours and the OSC was measured using the previously described TGA test. The aged surface area was 1.0 $m^2$/g, the oxygen storage capacity (OSC) was 376 μmole $O_2$/g sample and the oxygen release rate was 7.5 mg-$O_2$/$m^2$-min. The Normalized Scattering Intensity I(Q) was 57 at Q=0.1 $Å^{-1}$.

Example 3

586 g of cerium (III) carbonate (49.5% solids) was dissolved in 1105 g of an aqueous zirconyl nitrate solution (20 wt % solids) and 310 g of concentrated nitric acid. The mixed oxide solution had a concentration of 26.7% solids. 93 g of this solution was precipitated in 400 ml 5N ammonia solution at 60C. After 30 min. of agitation, 1000 ml of a 3 wt % aqueous hydrogen peroxide solution were added to the slurry. The molar ratio of hydrogen peroxide to cerium oxide was 0.25.

The slurry was filtered and washed with 3 liters of DI water at 70° C. The filter cake was re-slurried in water and 15 ppm of Pd, as the nitrate, was added to provide the final mixed oxide with 15 ppm Pd. The resulting mixture was spray dried and calcined at 500° C. for 1 hour. The final composition contained 42 wt % zirconium oxide and 58 wt % cerium oxide.

The powder was aged at 1000° C. for 4 hrs. The 500° C. TGA reduction procedure gave an OSC of 342 μmole $O_2$/g sample and an oxygen release rate of 1.9 mg-$O_2$/$m^2$-min. The Normalized Scattering Intensity I(Q) was 70 at Q=0.1 $Å^{-1}$.

Example 4

A filter cake was prepared using the procedure in Example 3 except that the aqueous filter cake slurry was doped with 100 ppm Pd, as the nitrate, prior to spray drying. The spray-dried powder was calcined and aged as in Example 3. The scattering intensity was 69 at Q=0.1 $Å^{-1}$, the OSC was 350 μmole $O_2$/g sample and the oxygen release rate was 50.5 mg-$O_2$/$m^2$-min.

Example 5

A filter cake was prepared using the procedure in Example 3 except that the aqueous filter cake slurry was doped with 1000 ppm Ni, as the nitrate, prior to spray drying. The spray-dried powder was calcined and aged as in Example 3. The Normalized Scattering Intensity I(Q) was 69 at Q=0.1

Å$^{-1}$, the OSC was 308 μmole O$_2$/g sample and the oxygen release rate was 1.2 mg-O$_2$/m$^2$-min.

Example 6

A mixed nitrate solution was made by combining 930 g of an aqueous cerium (III) nitrate solution (28.3 wt % oxide) with 900 g of an aqueous zirconium hydroxy nitrate solution having a Zr:NO$_3$ ratio of approximately 1:1 (25.3 wt % oxide). The mixed solution had a solids content of 26.8 wt % on an oxide basis. The final oxide composition was 52.5 wt % CeO$_2$ and 47.5 wt % ZrO$_2$.

The solution was added to 8 liters of 5N ammonia at 40° C. The precipitated hydroxide was treated with 1000 ml of a 3 wt % aqueous hydrogen peroxide solution.

The molar ratio of hydrogen peroxide to cerium oxide was 0.25. The filter cake was re-slurried in water and 15 ppm of Pd, as the nitrate, was added. The resulting mixture was spray dried and calcined at 500° C. for 1 hour. The calcined powder was aged at 1000° C. for 4 hours prior to measuring the available oxygen of the sample at 500° C. using the gravimetric apparatus. The OSC was 379 μmole O$_2$/g sample and the oxygen release rate was 14.3 mg-O$_2$/m$^2$-min. The Normalized Scattering Intensity I(Q) was 55 at Q=0.1 Å$^{-1}$.

Example 7

A mixed nitrate solution was made by mixing 633 g of cerium (III) carbonate (55 wt % oxide) was dissolved in 570 g of 70 wt % nitric acid and 142 g of DI water to make a cerium (III) nitrate solution having 29 wt % solids. This was mixed with 965 g of an aqueous zirconium hydroxy nitrate solution (26.1 wt % oxide) having a Zr:NO$_3$ ratio of approximately 1:1. The concentration of the mixed nitrate solution was 27.7 wt % oxide solids. The final oxide composition was 58.9% CeO$_2$ and 41.2% ZrO$_2$. The solution was added to 8 liters of 5N ammonia at 40° C. with agitation. The precipitated hydroxide was treated with 1000 ml of a 3% aqueous hydrogen peroxide solution (H$_2$O$_2$/CeO$_2$=0.25M) prior to filtration and washing of the ammonium nitrate. The filter cake was reslurried with water and doped with 15 ppm of Pd as the nitrate. The slurry was spray dried and calcined at 500° C. for 1 hour. After aging the powder at 1000° C. for 4 hours, the OSC of the sample at 500° C. using the gravimetric apparatus was measured to be 377 μmole O$_2$/g sample and the oxygen release rate was 7.5 mg-O$_2$/m$^2$-min. The Normalized Scattering Intensity I(Q) was 77 at Q=0.1 Å$^{-1}$.

Example 8

A mixed nitrate solution was made by mixing 67.1 g of an aqueous cerium (III) nitrate solution (28 wt % oxide) with 22.6 g of an aqueous zirconium hydroxy nitrate solution having a Zr:NO$_3$ ratio of approximately 1:1 (26.1 wt % oxide) yielded a final mixed nitrate solution concentration of 27.5 wt % solids on an oxide basis. The final oxide composition was 70 wt % CeO$_2$ and 30 wt % ZrO$_2$. The solution was added to 400 ml of 5N ammonia at 40° C. and stirred for 30 min. The precipitated hydroxide was treated with a solution of 6.25 g of hydrogen peroxide in 45 g of DI (H$_2$O$_2$/CeO$_2$=0.25M) prior to filtration and washing of the ammonium nitrate. The filter cake was reslurried with water and doped with 15 ppm of Pd as the nitrate. The slurry was spray dried and calcined at 500° C. for 1 hour and aged at 1000° C. for 4 hours. The OSC of the sample at 500° C. using the gravimetric apparatus was 310 μmole O$_2$/g sample. The oxygen release rate was 5.2 mg-O$_2$/m$^2$-min. The Normalized Scattering Intensity I(Q) was 70 at Q=0.1 Å$^{-1}$.

Example 9

The nitrate solutions were prepared and precipitated the same as in Example 6. Lanthanum nitrate was added to the cerium and zirconium nitrate to give a final solids content of the mixed nitrate solution equal to 27.3 wt % oxide. The precipitation, drying and calcination being carried out as in Example 6 to give a final oxide composition of 51 wt % CeO$_2$, 44 wt % ZrO$_2$ and 5 wt % La$_2$O$_3$. After aging the powder at 1000° C. for 4 hours the oxygen storage capacity based on the TGA measurement was 391 μmole O$_2$/g sample. The oxygen release rate was 3.4 mg-O$_2$/m$^2$-min. The Normalized Scattering Intensity I(Q) was 92 at Q=0.1 Å$^{-1}$.

Example 10

46.5 g of an aqueous cerium (III) nitrate solution (28.5 wt % solids) was mixed with 61.8 g of an aqueous zirconium nitrate solution (20 wt % solids) to give a mixed solution concentration of 23.6 wt % solids on an oxide basis. The solution was poured into 400 ml of 5N ammonia solution at a temperature of 60° C. under continuous agitation. The slurry was mixed for 30 minutes at 60° C. after which time, 25 g of a 30 wt % aqueous hydrogen peroxide solution was added.

The precipitate was washed with 3 liters of hot DI water. The filter cake was diluted with water in a ratio of 1:1 to form a slurry and 15 ppm palladium was added as a nitrate solution prior to spray drying. The dried powder was calcined at 500° C. for 1 hour to yield a final mixed oxide composition of 48.4 wt % zirconium oxide and 51.6 wt % cerium oxide.

The powder was aged at 1000° C. for 4 hrs to give a product having a surface area of <1 m$^2$/g. The oxygen storage capacity (OSC) was 339 μmole O$_2$/g sample and the oxygen release rate was 15.0 mg-O$_2$/m$^2$-min. The sample was analyzed using small angle X-ray scattering (SAXS) as described above and exhibited a Normalized Scattering Intensity I(Q) at Q=0.1 Å$^{-1}$ of 54.

Example 11

A mixed nitrate solution was made by combining 17.2 g of an aqueous cerium (III) nitrate solution (29 wt % oxide) with 67 g of an aqueous zirconium hydroxy nitrate solution having a Zr:NO$_3$ ratio of approximately 1:1 (26.1 wt % oxide). To this solution was added 3.5 g of 28.5 wt % lanthanum nitrate and 4.85 g of 31 wt % yttrium nitrate. The mixed solution had a solids content of 27 wt % on an oxide basis. The final oxide composition was 20 wt % CeO$_2$, 70 wt % ZrO$_2$, 4 wt % La$_2$O$_3$ and 6 wt % Y$_2$O$_3$. The solution was added to 300 ml of 5N ammonia at 40° C. The precipitated hydroxide was treated with 51 ml of a 3 wt % aqueous hydrogen peroxide solution.

The molar ratio of hydrogen peroxide to ceria was 0.25. The filter cake was re-slurried in water and 15 ppm of Pd, as the nitrate, was added. The resulting mixture was spray dried and calcined at 500° C. for 1 hour. The calcined powder was aged at 1000° C. for 4 hours prior to measuring the available oxygen of the sample at 500° C. using the gravimetric apparatus. The OSC was 260 μmole O$_2$/g sample and the Normalized Scattering Intensity I(Q) at Q=0.1 Å$^{-1}$ was 85. The oxygen release rate was 5.8 mg-O$_2$/m$^2$-min.

Example 12

A mixed nitrate solution was made by combining 88.9 g of an aqueous cerium (III) nitrate solution (28.3 wt % oxide)

with 84.9 g of an aqueous zirconium hydroxy nitrate solution having a $Zr:NO_3$ ratio of approximately 1:1 (26.1 wt % oxide). To this solution was added 6.25 g of praseodymium carbonate and 1.5 g of nitric acid. The mixed solution had a solids content of 26.5 wt % on an oxide basis. The final oxide composition was 50 wt % $CeO_2$ 44 wt % $ZrO_2$ and 6 wt % $Pr_6O_{11}$. The solution was added to 700 ml of 5N ammonia at 40° C. The precipitated hydroxide was treated with 103 ml of a 3 wt % aqueous hydrogen peroxide solution.

The molar ratio of hydrogen peroxide to ceria was 0.25. The filter cake was re-slurried in water and 15 ppm of Pd, as the nitrate, was added. The resulting mixture was spray dried and calcined at 500° C. for 1 hour. The calcined powder was aged at 1000° C. for 4 hours prior to measuring the available oxygen of the sample at 500° C. using the gravimetric apparatus. The OSC was 396 μmole $O_2$/g sample and the Normalized Scattering Intensity I(Q) at Q=0.1 Å$^{-1}$ was 79. The oxygen release rate was 7.6 mg-$O_2$/m$^2$-min.

Example 13

A mixed nitrate solution was made by combining 88.9 g of an aqueous cerium (III) nitrate solution (28.3 wt % oxide) with 84.9 g of an aqueous zirconium hydroxy nitrate solution having a $Zr:NO_3$ ratio of approximately 1:1 (26.1 wt % oxide). To this solution was added 5.64 g of yttrium carbonate and 3 g of nitric acid. The mixed solution had a solids content of 26 wt % on an oxide basis. The final oxide composition was 50.6 wt % $CeO_2$ 44.4 wt % $ZrO_2$ and 5 wt % $Y_2O_3$. The solution was added to 700 ml of 5N ammonia at 40° C. The precipitated hydroxide was treated with 103 ml of a 3 wt % aqueous hydrogen peroxide solution.

The molar ratio of hydrogen peroxide to ceria was 0.25. The filter cake was re-slurried in water and 15 ppm of Pd, as the nitrate, was added. The resulting mixture was spray dried and calcined at 500° C. for 1 hour. The calcined powder was aged at 1000° C. for 4 hours prior to measuring the available oxygen of the sample at 500° C. using the gravimetric apparatus. The OSC was 344 μmole $O_2$/g sample and the Normalized Scattering Intensity I(Q) at Q=0.1 Å$^{-1}$ was 81. The oxygen release rate was 4.2 mg-$O_2$/m$^2$-min.

Example 14

A mixed nitrate solution was made by combining 87.4 g of an aqueous cerium (III) nitrate solution (29 wt % oxide) with 84.1 g of an aqueous zirconium hydroxy nitrate solution having a $Zr:NO_3$ ratio of approximately 1:1 (26.4 wt % oxide). To this solution was added 2.5 g of gadolinium oxide and 3 g of nitric acid. The mixed solution had a solids content of 27 wt % on an oxide basis. The final oxide composition was 50.6 wt % $CeO_2$ 44.4 wt % $ZrO_2$ and 5 wt % $Gd_2O_3$. The solution was added to 700 ml of 5N ammonia at 40° C. The precipitated hydroxide was treated with 103 ml of a 3 wt % aqueous hydrogen peroxide solution. The molar ratio of hydrogen peroxide to ceria was 0.25. The filter cake was re-slurried in water and 15 ppm of Pd, as the nitrate, was added. The resulting mixture was spray dried and calcined at SOOC for 1 hour. The calcined powder was aged at 1000° C. for 4 hours prior to measuring the available oxygen of the sample at 500° C. using the gravimetric apparatus. The OSC was 384 μmole $O_2$/g sample and the Normalized Scattering Intensity I(Q) at Q=0.1 Å$^{-1}$ was 65. The oxygen release rate was 4.0 mg-$O_2$/m$^2$-min.

Example 15

A mixed nitrate solution was made by combining 87.4 g of an aqueous cerium (III) nitrate solution (29 wt % oxide) with 84.9 g of an aqueous zirconium hydroxy nitrate solution having a $Zr:NO_3$ ratio of approximately 1:1 (26.1% oxide). To this solution was added 4 g of samarium carbonate (63.4 wt % oxide) and 4 g of nitric acid. The mixed solution had a solids content of 27 wt % on an oxide basis. The final oxide composition was 50.6 wt % $CeO_2$ 44.4 wt % $ZrO_2$ and 5 wt % $Sm_2O_3$. The solution was added to 700 ml of 5N ammonia at 40° C. The precipitated hydroxide was treated with 103 ml of a 3 wt % aqueous hydrogen peroxide solution.

The molar ratio of hydrogen peroxide to ceria was 0.25. The filter cake was re-slurried in water and 15 ppm of Pd, as the nitrate, was added. The resulting mixture was spray dried and calcined at 500° C. for 1 hour. The calcined powder was aged at 1000° C. for 4 hours prior to measuring the available oxygen of the sample at 500° C. using the gravimetric apparatus. The OSC was 385 μmole $O_2$/g sample and the Normalized Scattering Intensity I(Q) at Q=0.1 Å$^{-1}$ was 70. The oxygen release rate was 3.8 mg-$O_2$/m$^2$-min.

Example 16

A mixed nitrate solution was made by combining 87.4 g of an aqueous cerium (III) nitrate solution (29 wt % oxide) with 84.1 g of an aqueous zirconium hydroxy nitrate solution having a $Zr:NO_3$ ratio of approximately 1:1 (26.4 wt % oxide). To this solution was added 10.5 g of calcium carbonate and 3 g of nitric acid. The mixed solution had a solids content of 27 wt % on an oxide basis. The final oxide composition was 50.6 wt % $CeO_2$ 44.4 wt % $ZrO_2$ and 5 wt % CaO. The solution was added to 700 ml of 5N ammonia at 40° C. The precipitated hydroxide was treated with 103 ml of a 3 wt % aqueous hydrogen peroxide solution.

The molar ratio of hydrogen peroxide to ceria was 0.25. The filter cake was re-slurried in water and 15 ppm of Pd, as the nitrate, was added. The resulting mixture was spray dried and calcined at 500° C. for 1 hour. The calcined powder was aged at 1000° C. for 4 hours prior to measuring the available oxygen of the sample at 500° C. using the gravimetric apparatus. The OSC was 359 μmole $O_2$/g sample and the Normalized Scattering Intensity I(Q) at Q=0.1 Å$^{-1}$ was 65. The oxygen release rate was 8.5 mg-$O_2$/m$^2$-min.

Example 17

Example 3 was repeated except, after precipitating the slurry at 60° C., the temperature was raised and the slurry was heated at 90° C. for two hours in the mother liquor. The precipitate was then filtered, washed and treated identically as described in Example 3. The structure had been changed significantly by heating the slurry and the desired domain structure was destroyed by the high temperature. This resulted in a loss of OSC at 500° C. to a value of only 290 μmole $O_2$/g sample. The material exhibited a Normalized Scattering Intensity I(Q) of 107 at Q=0.1 Å$^{-1}$. The oxygen release rate of the material was 4.3 mg-$O_2$/m$^2$-min.

Comparative Example 1

1147 g of water and 136 g of acetic acid were mixed and 236 g of cerium carbonate was added to form a clear solution of cerium acetate. The mixture was stirred for 48 hours to completely dissolve the carbonate. To the cerium acetate was added 512 g of zirconium acetate (20 wt % ZrO2) and stirred to make a homogeneous solution. The solution was spray dried at 110° C. to form a white powder of mixed acetates. The powder was calcined in a muffle furnace to a temperature of 500° C. for 1 hour to form the finished mixed oxide.

The freshly calcined oxide was impregnated with 15 ppm Pd from an aqueous nitrate solution and calcined at 500° C. for 1 hour. The sample was aged at 1000° C. for 4 hours. The OSC as measured in the TGA at 500° C. was 290 μmole $O_2$/g sample. The sample was analyzed using SAXS. The Normalized Scattering Intensity I(Q) was only 40 at Q=0.1 $Å^{-1}$ as shown in FIG. 2. The Normalized Scattering Intensity I(Q) versus Q was plotted in FIG. 1. The surface area was 1 $m^2$/g. The oxygen release rate was 0.5 mg-$O_2$/$m^2$-min. The final oxide composition was 60 wt % $CeO_2$, 38 wt % $ZrO_2$ and 2 wt % $La_2O_3$.

Comparative Example 2

A mixed oxide powder was prepared using the procedure of Comparative Example 1 except the freshly calcined sample was impregnated with 1000 ppm Ni from a nitrate solution. The powder was then calcined at 500° C. for 1 hour. The sample was aged at 1000° C. for 4 hours. The OSC as measured in the TGA at 500° C. was 218 μmole $O_2$/g sample and a Normalized Scattering Intensity I(Q) of 46 at Q=0.1 $Å^{-1}$. The oxygen release rate was 0.2 mg-$O_2$/$m^2$-min.

Comparative Example 3

An aqueous cerium (III) nitrate solution was prepared by dissolving 58.6 g of cerium (III) carbonate (49.5 wt % oxide) in 135 g water and 50.4 g concentrated nitric acid. To this was added 110.5 g zirconyl nitrate (20 wt % oxide). The final mixed nitrate solution had a concentration of 15.7 wt % solids. 50 g of 30% an aqueous hydrogen peroxide was added to the nitrate solution. Into a heal of 350 g of 70° C. DI water, the peroxide treated nitrate solution was co-precipitated in a vessel against 300 ml 5N ammonia. A temperature of 70° C. and to maintain a pH of 8.6. After all of the solution has been added the precipitate was aged at 70° C. for 0.5 hours.

The precipitate was filtered, washed with 3 liters of 70° C. water. The washed filter cake was reslurried with water and spray dried. The dried powder was impregnated with 15 ppm Pd as a nitrate solution and calcined at 500° C. for 1 hour to yield a product having surface area >100 $m^2$/g. After aging at 1000 for 4 hours the surface area was 17 $m^2$/g. The OSC as measured by TGA under 500° C. isothermal conditions was only 274 μmole $O_2$/g. The sample was analyzed using SAXS. The Normalized Scattering Intensity I(Q) as measured by SAXS was 152 at Q=0.1 $Å^{-1}$ as shown in FIG. 2. The oxygen release rate was 2.4 mg-$O_2$/$m^2$-min.

Comparative Example 4

The filter cake from Comparative Example 4 was instead impregnated with 100 ppm Pd prior to calcination. The OSC as measured by TGA under 500° C. isothermal conditions was only 275 μmole $O_2$/g sample. The Normalized Scattering Intensity I(Q) as measured by SAXS was 120 at Q=0.1 $Å^{-1}$. The oxygen release rate was 4.0 mg-$O_2$/$m^2$-min.

While the present invention has been described in terms of various preferred embodiments, the skilled artisan will appreciate that various modifications, substitutions, omissions, and changes may be made without departing from the spirit thereof.

What is claimed is:

1. A mixed oxide of cerium oxide and zirconium oxide having a polyphasic cubic crystalline habit, and an oxygen storage capacity of greater than 300 μmole $O_2$/g sample after aging at 1000° C. for 4 hours.

2. The mixed oxide of claim 1 wherein the oxygen storage capacity is greater than 315 μmole $O_2$/g sample after aging at 1000° C. for 4 hours.

3. The mixed oxide of claim 2 wherein the oxygen storage capacity is greater than 330 μmole $O_2$/g sample after aging at 1000° C. for 4 hours.

4. The mixed oxide of claim 1 wherein the mixed oxide has an oxygen release rate of greater than 1.0 mg-$O_2$/$m^2$-min.

5. The mixed oxide of claim 4 wherein the mixed oxide has an oxygen release rate of greater than 2.0 mg-$O_2$/$m^2$-min.

6. The mixed oxide of claim 5 wherein the mixed oxide has an oxygen release rate of greater than 5.0 mg-$O_2m^2$-min.

7. The mixed oxide of claim 4 wherein the mixed oxide, as determined by a small angle X-ray scattering (SAXS) technique, has a Normalized Scattering Intensity I(Q) of about 47 to about 119 when the scattering vector Q is 0.10 $Å^{-1}$.

8. The mixed oxide of claim 7 wherein the mixed oxide, as determined by a small angle X-ray scattering (SAXS) technique, has a Normalized Scattering Intensity I(Q) of about 50 to 100 when scattering vector Q is 0.10 $Å^{-1}$.

9. The mixed oxide of claim 8 wherein the mixed oxide, as determined by a small angle X-ray scattering (SAXS) technique, has a Normalized Scattering Intensity I(Q) of about 54 to about 85 when scattering vector Q is 0.10 $Å^{-1}$.

10. The mixed oxide of claim 1 wherein the mixed oxide, as determined by a small angle X-ray scattering (SAXS) technique, has a Normalized Scattering Intensity I(Q) of about 47 to about 119 when the scattering vector Q is 0.10 $Å^{-1}$.

11. The mixed oxide of claim 10 wherein the mixed oxide, as determined by a small angle X-ray scattering (SAXS) technique, has a Normalized Scattering Intensity I(Q) of about 50 to 100 when scattering vector Q is 0.10 $Å^{-1}$.

12. The mixed oxide of claim 10 wherein the mixed oxide, as determined by a small angle X-ray scattering (SAXS) technique, has a Normalized Scattering Intensity I(Q) of about 54 to about 85 when scattering vector Q is 0.10 $Å^{-1}$.

13. The mixed oxide of claim 10 wherein a logarithm plot of the Normalized Scattering Intensity, ln(I(Q)), as a function of the logarithm of the scattering vector, ln(Q), at $-2.5 < \ln(Q) < -1$, has a straight line portion and the slope of the straight line portion is $-4.0 \pm 0.4$.

14. The mixed oxide of claim 1 wherein the mixed oxide comprises polycrystalline particles of cerium oxide and zirconium oxide.

15. The mixed oxide of claim 14 wherein the particles have an average particle size of about 0.1 to about 50 μm.

16. The mixed oxide of claim 15 wherein the particles have an average particle size of about 0.5 to about 20 μm.

17. The mixed oxide of claim 14 wherein the particles comprise crystallites having an average crystallite size of from about 40 to about 200 Å after calcination at 900° C. for 4 hours, as determined using X-ray diffraction.

18. The mixed oxide of claim 17 wherein the crystallites have an average crystallite size of from about 50 to about 120 Å after calcination at 900° C. for 4 hours as determined using X-ray diffraction.

19. The mixed oxide of claim 17 wherein the crystallites comprise a plurality of adjacent domains wherein said adjacent domains have different cerium to zirconium ratios.

20. The mixed oxide of claim 19 wherein the domains have an average size of from about 10 to about 50 Å.

21. The mixed oxide of claim 20 wherein the domains have an average size of from about 10 to about 30 Å.

22. The mixed oxide of claim 14 wherein the mixed oxide particles have a specific surface area of at least 30 $m^2$/g after calcination at 500° C. for 2 hours.

23. The mixed oxide of claim 22 wherein the mixed oxide particles have a specific surface area of at least 40 m²/g after calcination at 500° C. for 2 hours.

24. The mixed oxide of claim 23 wherein the mixed oxide particles have a specific surface area of at least 50 m²/g after calcination at 500° C. for 2 hours.

25. The mixed oxide of claim 14 wherein the mixed oxide particles have a specific surface area of no more than 10 m²/g after calcination at 1000° C. for 4 hours.

26. The mixed oxide of claim 25 wherein the mixed oxide particles have a specific surface area of no more than 5 m²/g after calcination at 1000° C. for 4 hours.

27. The mixed oxide of claim 26 wherein the mixed oxide particles have a specific surface area of no more than 3 m²/g after calcination at 1000° C. for 4 hours.

28. The mixed oxide of claim 1 wherein the mixed oxide comprises about 80 to 20 weight % $CeO_2$ and about 20 to 80 weight % $ZrO_2$.

29. The mixed oxide of claim 28 wherein the mixed oxide comprises about 40 to 60 weight % $CeO_2$ and about 60 to 40 weight % $ZrO_2$.

30. The mixed oxide of claim 29 wherein the mixed oxide comprises about 50 weight % $CeO_2$ and about 50 weight % $ZrO_2$.

31. The mixed oxide of claim 28 wherein the mixed oxide further comprises up to about 10 weight % of a metal oxide other than cerium oxide.

32. The mixed oxide of claim 31 wherein the metal oxide other than cerium oxide is selected from the group consisting of a rare earth metal oxide other than cerium oxide, calcium oxide, and mixtures thereof.

33. The mixed oxide of claim 32 wherein the rare earth metal oxide is an oxide selected from the group consisting of lanthanum, praseodymium, neodymium, samarium, gadolinium and yttrium.

34. A catalyst/catalyst support comprising the mixed oxide of claim 1 coated onto a substrate.

35. A catalyst/catalyst support comprising the mixed oxide of claim 4 coated onto a substrate.

36. The catalyst/catalyst support of claim 35 having a noble metal catalyst deposited on the mixed oxide.

37. A catalyst/catalyst support comprising the mixed oxide of claim 10 coated onto a substrate.

38. The catalyst/catalyst support of claim 37 having a noble metal catalyst deposited on the mixed oxide.

39. A catalyst/catalyst support comprising the mixed oxide of claim 7 coated onto a substrate.

40. The catalyst/catalyst support of claim 39 having a noble metal catalyst deposited on the mixed oxide.

41. A process of preparing a polycrystalline mixed oxide particles of cerium oxide and zirconium oxide, the process comprising:
   i) providing a mixed salt solution comprising at least one cerium salt and at least one zirconium salt in a concentration sufficient to provide polycrystalline particles of the corresponding dried mixed oxide product, said particles having a cerium oxide component and a zirconium oxide component wherein such components are distributed within the subcrystalline structure of the particles such that each crystallite in the particle is comprised of a plurality of adjacent domains wherein the Ce:Zr atomic ratios possessed by said adjacent domains are characterized by a degree of inhomogeneity in relation to each other, when measured by small angle X-ray scattering, and expressed as being possessed of a Normalized Scattering Intensity I(Q), of from about 47 to about 119 when scattering vector Q is 0.10 Å$^{-1}$, said mixed oxide composition being characterized as having an oxygen storage capacity of at least 260 μmoles $O_2$/g sample after aging at 1000° C. for 4 hours;
   ii) treating a mixed salt solution provided in accordance with step (i) with a base to form a precipitate;
   iii) treating a precipitate provided in accordance with step (ii) with an oxidizing agent in an amount sufficient to oxidize $Ce^{+3}$ to $Ce^{+4}$;
   iv) washing and drying a precipitate provided in accordance with step (iii); and
   v) calcining a dried precipitate provided in accordance with step (iv) to obtain polycrystalline cerium and zirconium oxide particles.

42. The process of claim 41 wherein the precipitate is treated with an aqueous dilute hydrogen peroxide to oxidize $Ce^{+3}$ to $Ce^{+4}$.

43. The process of claim 42 wherein the precipitate is treated with dilute hydrogen peroxide in an amount sufficient to provide a molar ratio of hydrogen peroxide to a Ce of from about 0.25 to about 1.

44. The process of claim 43 wherein the precipitate is treated with dilute hydrogen peroxide in an amount sufficient to provide a molar ratio of hydrogen peroxide to Ce of from about 0.5 to about 1.

45. The process of claim 44 wherein the mixed salt solution has a solids concentration of at least 23 weight % solids, on an oxide basis.

46. The process of claim 45 wherein the mixed salt solution has a solids concentration of greater than 25 weight % solids, on an oxide basis.

47. The process of claim 41 wherein the mixed salt solution has a solids concentration of from about 24 to about 39 weight % solids, on an oxide basis.

48. The process of claim 47 wherein the mixed salt solution has a solids concentration of from about 25 to about 29 weight % solids, on an oxide basis.

49. The process of claim 41 wherein the pH during step ii) is from about 8 to 11.

50. The process of claim 41 wherein the temperature during steps ii) and iii) is not greater than about 80° C.

51. The process of claim 50 wherein the temperature during steps ii) and iii) is not greater than about 70° C.

52. The process of claim 41 wherein the dried precipitate is calcined at a temperature of about 500° C. to about 600° C. for up to about 6 hours.

53. The process of claim 41 wherein a dopant is added following precipitation in step (ii).

54. The process of claim 53 wherein the dopant is added before or after calcination.

55. The process of claim 54 wherein the dopant is a group VIII transition metal.

56. The process of claim 55 wherein the dopant is a transition metal selected from the group consisting of nickel, palladium, platinum and mixtures thereof.

57. The process of claim 41 wherein the precipitate in step iv) is dried by slurrying the precipitate with water and subjecting the aqueous slurry to spray drying.

58. The process of claim 41 wherein the mixed salt solution is prepared by mixing a cerium salt with a zirconium salt solution having a cation to anion molar ratio of 1:1 to 1:2.

59. The process of claim 41 wherein the mixed salt solution is prepared by dissolving cerium carbonate into a 1:2 molar ratio zirconium salt solution and adding a minimum amount of an acid sufficient to dissolve the carbonate.

60. A mixed oxide produced by the process of claim 41.

61. A mixed oxide composition having a polyphasic cubic crystalline habit comprising polycrystalline particles having a cerium oxide component and a zirconium oxide component wherein such components are distributed within the subcrystalline structure of the particles such that each crystallite in the particle is comprised of a plurality of adjacent domains wherein the Ce:Zr atomic ratios possessed by said adjacent domains are characterized by a degree of inhomogeneity in relation to each other, when measured by small angle X-ray scattering, and expressed as being possessed of a Normalized Scattering Intensity I(Q), of from about 47 to about 119 when scattering vector Q is 0.10 $\text{Å}^{-1}$.

62. The mixed oxide composition of claim 61 wherein the mixed oxide composition has an oxygen release rate of greater than 1.0 mg-$O_2/m^2$-min.

63. The mixed oxide composition of claim 62 wherein the mixed oxide composition has an oxygen storage capacity of at least 260 $\mu$mole $O_2$/g sample after aging at 1000° C. for 4 hours.

64. The mixed oxide composition of claim 61 wherein the mixed oxide composition has an oxygen storage capacity of at least 260 $\mu$mole $O_2$/g sample after aging at 1000° C. for 4 hours.

65. The mixed oxide composition of claim 61 wherein the Normalized Scattering Intensity I(Q) ranges from about 50 to 100 when scattering vector Q is 0.10 $\text{Å}^{-1}$.

66. The mixed oxide composition of claim 65 wherein the Normalized Scattering Intensity I(Q) ranges from about 54 to 85 when scattering vector Q is 0.10 $\text{Å}^{-1}$.

67. The mixed oxide composition of claim 61 wherein a logarithm plot of the Normalized Scattering Intensity, ln(I(Q)), as a function of the logarithm of the scattering vector, ln(Q), at $-2.5 < \ln(Q) < -1$, has a straight line portion and the slope of the straight line portion is $-4.0 \pm 0.4$.

\* \* \* \* \*